United States Patent [19]

Wang et al.

[11] Patent Number: 4,645,442
[45] Date of Patent: Feb. 24, 1987

[54] SHELL FORMING APPARATUS

[75] Inventors: Taylor G. Wang, Glendale; Dan Granett, Los Angeles; Wesley M. Akutagawa, Pasadena, all of Calif.

[73] Assignee: California Institute of Technology, Pasadena, Calif.

[21] Appl. No.: 490,360

[22] Filed: May 2, 1983

[51] Int. Cl.[4] .............................................. B29B 9/00
[52] U.S. Cl. ............................................ 425/6; 264/5; 264/8; 425/8
[58] Field of Search .................... 264/5, 8, 15, 271; 425/6, 8

[56] References Cited

U.S. PATENT DOCUMENTS

| | | | |
|---|---|---|---|
| 3,038,236 | 6/1962 | Breen | 264/171 |
| 3,118,011 | 1/1964 | Breen | 264/171 |
| 3,315,021 | 4/1967 | Luzzatto | 264/171 |
| 3,907,537 | 9/1975 | Irgens-Bergh | 264/8 |
| 4,218,409 | 8/1980 | Dannelly | 264/8 |
| 4,303,431 | 12/1981 | Torobin | 264/5 |
| 4,303,433 | 12/1981 | Torobin | 264/8 |
| 4,303,603 | 12/1981 | Torobin | 264/129 |

Primary Examiner—Jay H. Woo
Assistant Examiner—Timothy W. Heitbrink
Attorney, Agent, or Firm—Freilich, Hornbaker, Rosen & Fernandez

[57] ABSTRACT

A nozzle assembly is described for use in a system that forms small gas-filled shells, which avoids the need for holding a miniature inner nozzle precisely concentric with a miniature outer nozzle. The outer nozzle has a diameter which is less than about 0.7 millimeter, which results in fluid passing through the nozzle having a progressively greater velocity at locations progressively further from the walls of the outer nozzle across most of the nozzle. This highly variable velocity profile automatically forces gas to the center of the outer nozzle. The end of the inner nozzle, which emits gas, is spaced upstream from the tip of the outer nozzle, to provide a distance along which to center the gas. This self-centering characteristic permits the inner nozzle to be positioned so its axis is not concentric with the axis of the outer nozzle.

8 Claims, 6 Drawing Figures

SHELL FORMING APPARATUS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to the forming of fluid-filled shells by passing fluid through nozzles.

Gas-filled shells can be formed by passing a molton material through an outer nozzle and passing a gas through an inner nozzle concentric with the outer nozzle, so that a gas-filled extrusion is created that breaks up into gas-filled spheres. Where the gas-filled spheres, or shells, are to be of uniform size, the extrusion should be of uniform wall thickness. Prior art systems have constructed the nozzle assembly with the inner nozzle held precisely concentric with outer nozzle, to assure that the extrusion will have uniform wall thickness all around its axis.

When small shells are to be constructed of millimeter or submillimeter size, it becomes difficult to precisely center the inner nozzle within the outer nozzle. The difficulty is compounded where the liquid must be at a high temperature and is highly corrosive, as in the case where liquid metal is pumped through the outer nozzle, since many suitable nozzle materials are difficult to machine. Furthermore, the large temperature rises from room temperature to operation temperature, can cause thermal expansions leading to bending of the parts that results in misalignment of the inner and outer nozzles. A nozzle assembly for use in systems for generating shells of small diameter as in the millimeter and submillimeter range, which could be constructed and maintained at moderate cost, would be of benefit in the construction of such systems.

SUMMARY OF THE INVENTION

In accordance with one embodiment of the present invention, a nozzle assembly is provided for use in forming shells of the millimeter and submillimeter size, which can be constructed and maintained at relatively low cost. The nozzle assembly includes an outer nozzle for passing an encapsulating fluid out of its tip, and an inner nozzle for passing an encapsulant fluid out of an end thereof which opens to the inside of the outer nozzle. The width of the outside nozzle near its tip is less than about 0.7 millimeter, and the end of the inner nozzle is spaced behind the outer nozzle tip. The end of the inner nozzle can lie away from the axis of the outer nozzle and/or be oriented so its axis is not aligned with that of the outer nozzle, and yet forces operating in the nozzle assembly automatically center the encapsulant fluid emitted from the inner nozzle within the stream exiting from the tip of the outer nozzle.

The novel features of the invention are set forth with particularity in the appended claims. The invention will be best understood from the following description when read in conjuction with the accompanying drawings.

BRIEF DESCRIPTIONS OF THE DRAWINGS

DESCRIPTION OF THE PREFERRED EMBODIMENTS

Figure 1:
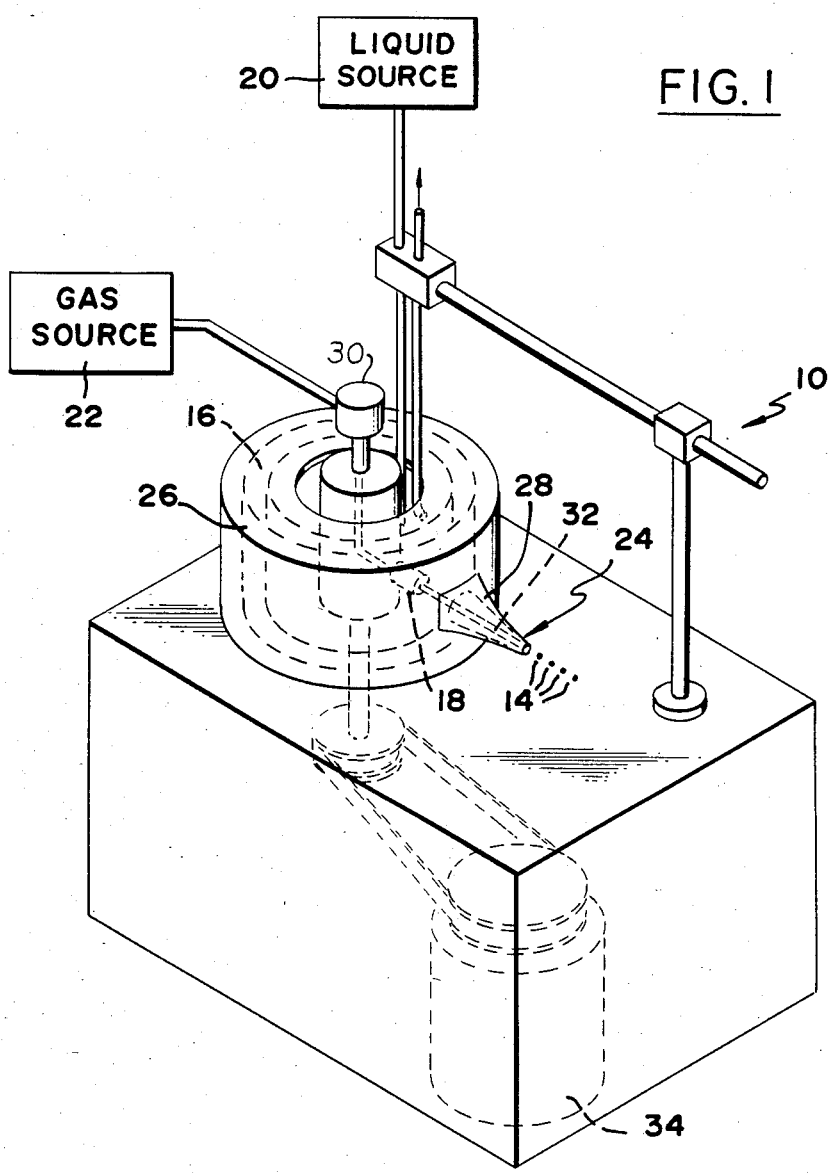
FIG. 1 is a simplified perspective view of a system for forming fluid-filled shells.

FIG. 1 illustrates a system 10 for forming fluid-filled shells 14 by the passage of an encapsulating fluid 16 such as a molton metal around encapsulant fluid 18 such as a gas that is to be encapsulated. The liquid, such as a molton metal, is supplied from a source 20, while the gas is supplied from another source 22. In this particular system, wherein the shells 14 are of very small size, centrifugal force is used to help force the liquid and gas through a nozzle assembly 24 and to help break up the emerging stream into the shells. Accordingly, the liquid is applied to a rotating liquid container 26 which leads to an outer nozzle 28 of the nozzle assembly. The gas is applied through a rotating seal 30 for application to an inner nozzle 32 of the nozzle assembly. A motor 34 rotates the container 26 and parts that rotate with it.

Figure 2:
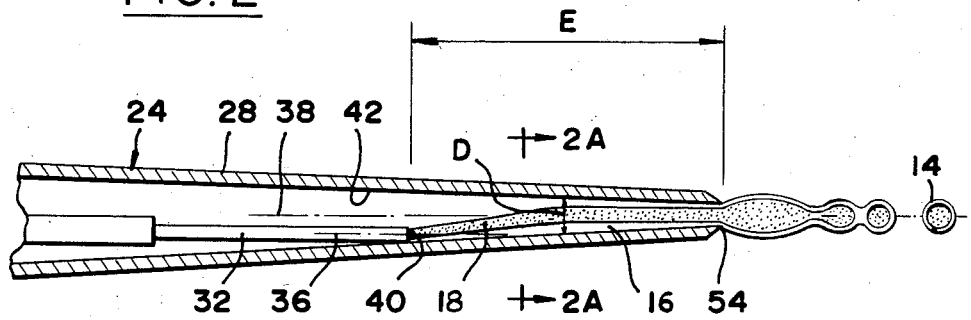
FIG. 2 is a sectional side view of the nozzle assembly of the system of FIG. 1.

FIG. 2 illustrates some details of the nozzle assembly 24, showing that the inner nozzle 32 has an axis 36 that is not aligned with the axis 38 of the outer nozzle 28. Instead, the axes are displaced from one another at the end 40 of the inner nozzle, and are also angled from parallelism with one another. It has been found that when a nozzle assembly of small diameter, such as where the inside 42 of the outer nozzle is less than about 0.7 millimeter is used, gas emitted the inner nozzle will center itself within the flow of liquid through the outer nozzle. This self-centering effect appears to be caused by the continuous variation in the velocity of liquid, at locations progressively spaced along the radius of the outer nozzle 28.

Figure 3:
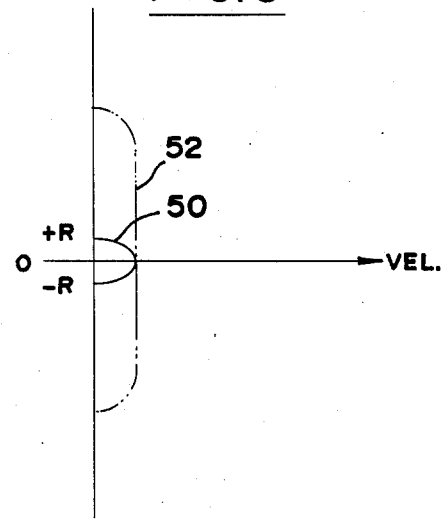
FIG. 3 is a graph showing the velocity profile of fluid passing through the nozzle of FIG. 2, and comparing it to the variation of velocity with position in a nozzle of much larger size.

FIG. 3 includes a graph 50 which indicates the variation in velocity of liquid flowing through the outer nozzle 28, at various distances from the axis 38. So long as there is rapid laminar flow, there is a significant change in fluid velocity with change in distance from the axis of the outer nozzle. Thus, there, is substantially zero velocity at the locations $+R$ and $-R$ which represent locations at the inside surface of the outer nozzle. At the "O" location which represents the axis, there is maximum velocity. Where the flow is fastest, the pressure of the fluid may be lowest. As a result, the lowest pressure would be at the axis of the outer nozzle, and a gas bubble would seek this location. The graph 50 may be compared with another graph 52 which represents the variation in velocity with position for a nozzle that has an inside diameter of much more than 0.7 millimeter. In that case, there would be a significant variation in velocity with position near the walls of the nozzle, but there would be almost constant velocity over a wide middle region of the nozzle; a gas bubble could remain anywhere within this middle region. In any case, it has been found that when water, which has a relatively low viscosity, is pumped through a nozzle of less than about 0.7 millimeter diameter (average diameter or at the tip), gas pumped through an inner nozzle will center itself so as to produce shells of uniform size, even though the end of the inner nozzle is far from the axis of the outer nozzle, as shown in FIG. 2.

In order to obtain the highly variable velocity profile shown for the graph 50 in FIG. 3, it is also necessary that the liquid flowing through the outer nozzle, flow at a significant velocity. For an outer nozzle having an average diameter D, which is the average of all diameters between the end 40 of the inner nozzle and the tip 54 of the outer nozzle, the velocity of the liquid 16 should be at least 100 times D per second. Thus, with a nozzle of average diameter D of 0.2 millimeter, the liquid should flow at a velocity of at least 20 millimeters per second. However, the velocity should not be so great that it creates turbulance, and therefore an unpredictable velocity at different locations within the nozzle.

Applicant has conducted tests in which water and air were pumped, respectively, through the outer and inner nozzles. In one series of tests, the inside diameter D of the outer nozzle was about 0.2 millimeter, while the inside diameter of the inner nozzle was about 0.14 millimeter. The water was pumped through the outer nozzle at a velocity of about 200 millimeter per second. The end 40 of the inner nozzle was positioned behind the tip 54 of the outer nozzle by a distance E of a few millimeters, and the inner nozzle 32 was merely laid within the outer one without any efforts to center it. The system produced highly uniform shells.

Figure 2A:
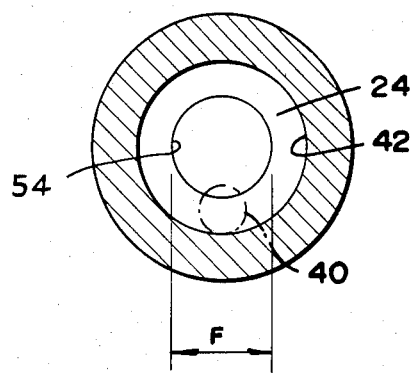
FIG. 2A is a view on line 2A—2A of FIG. 2.

The distance E of the end of the inner nozzle from the tip of the outer one, should be great enough to permit the air bubble or air stream to center itself. The distance required depends upon several factors, including how far off center the end 40 of the inner nozzle is, the diameter of the nozzle, the relative densities and viscosities of the liquid and gaseous fluids passing through the outer and inner nozzles, and other factors. It is desireable to position the end 40 of the inner nozzle a distance E behind the outer nozzle which is at least twice the diameter F (FIG. 2A) of the tip of the outer nozzle to cover the situation where the inner nozzle is far off center.

Figure 4:
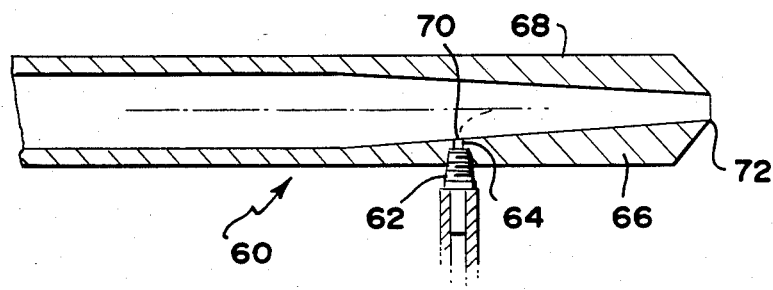
FIG. 4 is a sectional view of a nozzle assembly constructed in accordance with another embodiment of the invention.

FIG. 4 illustrates another nozzle assembly 60, in which the inner nozzle 62 includes a hole 64 that is formed through the wall 66 of the pipe that forms the outer nozzle 68. As a result, the end of the inner nozzle at the location 70, lies substantially at the inner surface of the outer nozzle, which is where the gas encounters a flowing liquid stream, although the end still can be said to lie within the outer nozzle. This arrangement is especially useful where a hot and highly corrosive encapsulating material is used, such as a liquid metal. In this arrangement, no solid part of the inner nozzle, other than the walls of the hole 64, is in direct contact with rapidly flowing molton metal. As in the case of the nozzle assembly 24 of FIG. 2, the end 70 of the inner nozzle is spaced by a plurality of diameters upstream from the tip 72 of the outer nozzle. Also, a fluid velocity of at least 100 times the diameter of the tip 72, per second, of the liquid is maintained in the outer nozzle, and the outer nozzle has an average diameter between the intersection location 70 and the outer nozzle tip 72 which is less than about 0.7 millimeter.

Figure 5:
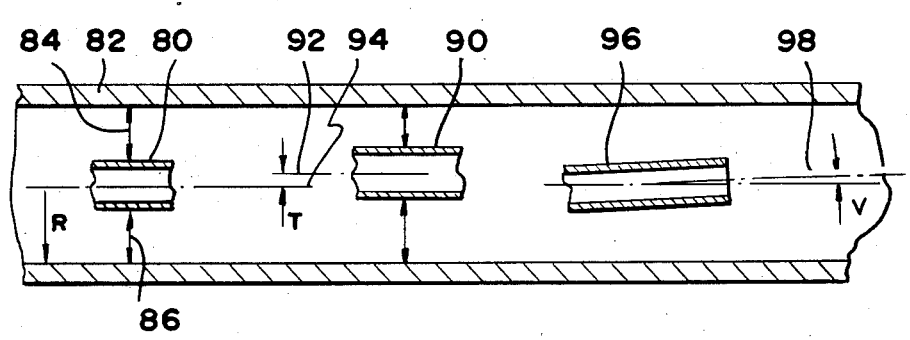
FIG. 5 is a diagramatic view of a nozzle system, indicating the importance of various perameters thereof.

FIG. 5 indicates the difference in orientation and location of inner nozzles of the present invention as compared to the prior art. The tube 80 represents an inner nozzle held within an outer nozzle 82. In the prior art, the inner nozzle 80 was precisely centered within the outer nozzle with only a small tolerance. The tolerance would be small enough so that the clearances 84, 86 on opposite sides of the inner nozzle would be less than 1% of the radius R of the outer nozzle. A tolerance resulting in clearances such as 84, 86 which were different by more than 10% of the radius R would normally not be encountered. The tube 90 is shown with its axis 92 displaced from the axis 94 of the outer nozzle by a distance T which is 10% of the radius R of the outer nozzle, resulting in clearances on either side being different by 10% of the radius. Such a large off-center position would normally not be encountered in the prior art. In the present invention, such off-centering could be used, and the inner nozzle could even lie against the wall of the outer nozzle as in FIG. 2. Such an off-center location facilitates mounting of the inner nozzle, because no special provisions have to be taken for shifting of the inner nozzle when it undergoes a large temperature change, as from room temperature to the operating temperature at which molton metal may flow around it. FIG. 5 also shows an inner nozzle 96 whose end lies on the axis 94 of the outer nozzle, but with the inner nozzle axis 98 angled from the outer nozzle by an angle V of 2°. Such an angle of a plurality of degrees normally would not be encountered in the prior art, but a much larger angle even up to 90° (or more) can be tolerated in the nozzle assembly of the present invention.

Thus, the invention provides a nozzle assembly for use in a shell-forming system, which greatly facilitates construction and maintance of the nozzle assembly. For an assembly with an outer nozzle having an average diameter of no more than about a millimeter, preferably less than about 0.7 millimeter and with the end of the inner nozzle spaced behind the tip of the outer one, the nozzle assembly can be constructed so the inner nozzle does not have to be placed with its axis in alignment with that of the outer nozzle. Instead, the axis of the inner nozzle can be displaced by more than 10% of the outer nozzle radius and can be angled by a plurality of degrees from the axis of the inner nozzle. The end of the inner nozzle preferably lies a plurality of average diameters of the outer nozzle upstream from the tip of the outer nozzle, to provide at least a small distance over which the gas or other fluid emitted from the inner nozzle can move into a position along the axis of the outer nozzle. While the system is useful primarily for fluids wherein the outer one is a liquid and the inner one a gas, it is possible to use two liquids or to use two gases.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a system for forming fluid-filled shells by the passage of an encapsulating fluid around an encapsulant fluid and into an environment where the encapsulating fluid becomes solid, the improvement of a nozzle assembly for controlling the passage of the fluids, comprising:

an outer nozzle for passing encapsulating fluid, said outer nozzle having an inside and a tip;

an inner nozzle for passing an encapsulant fluid, said inner nozzle having an end, and said inner nozzle end opening to the inside of said outer nozzle;

a first source of an encapsulating fluid coupled to said outer nozzle at a location upstream of said end of said inner nozzle to flow said encapsulating fluid through said outer nozzle;

a second source of an encapsulant fluid coupled to said inner nozzle to flow said encapsulant fluid therethrough and out of said end of said inner nozzle;

the width of the inside of said outer nozzle being no more than about one millimeter near said tip of the outer nozzle, and said end of said inner nozzle lying behind the tip of said outer nozzle by a distance more than twice said inside diameter of said outer nozzle.

2. The improvement described in claim 1 including:

means for moving liquid through said outer nozzle at a velocity past said end of said inner nozzle, which is more than one hundred times said width per second.

3. The system described in claim 1 wherein:

said outer nozzle comprises a pipe having a wall forming a passage through which said encapsulating fluid passes, and said inner nozzle includes a hole formed through said wall of said pipe, the walls of said hole forming an intersection with said passage, said inner nozzle having an end substantially at the inner surface of said pipe at the intersection of said passage and the walls of said hole.

4. The system described in claim 1 wherein:

said inner nozzle includes a pipe that lies in said outer nozzle, with its end positioned off-center so the clearance between said nozzles at the end of said inner nozzle, is at least 10% greater on one side of said inner nozzle than on the opposite side thereof.

5. In a shell-forming system the improvement of a nozzle assembly comprising:

outer and inner nozzles, said inner nozzle having an end lying within said outer nozzle and said outer nozzle having a tip lying downstream of said inner nozzle end, the tip of said inner nozzle lying upstream from the tip of said outer nozzle by a distance of more than twice the diameter of said outer nozzle at its tip;

a first source of an encapsulating fluid coupled to said outer nozzle at a location upstream of said end of said inner nozzle to flow said encapsulating fluid through said outer nozzle;

a second source of an encapsulant fluid which is different from said encapsulating fluid, coupled to said inner nozzle to flow said encapsulant fluid therethrough and out of said end of said inner nozzle;

said outer nozzle having a minimum diameter of less than 0.7 millimeter between the end of said inner nozzle and the tip of said outer nozzle, said outer nozzle having an outer nozzle axis that passes through the center of said outer nozzle tip, said inner nozzle having an inner nozzle axis that passes through the center of said inner nozzle end, said axes being nonconcentric.

6. The improvement described in claim 5 wherein:

said nozzles are oriented so they are angularly spaced by a plurality of degrees.

7. The improvement described in claim 5 wherein:

said nozzles are located so at the end of said inner nozzle the clearance between said nozzles is more than 10% greater on one side than on the opposite side.

8. In a system for forming fluid-filled shells by passing an encapsulating liquid through an outer nozzle and an encapsulant gas through an inner nozzle, the improvement comprising:

an outer nozzle having a tip of a diameter no more than 0.7 millimeter, for carrying said encapsulating liquid, said outer nozzle having a wall forming a passage leading to said tip;

said outer nozzle having a hole in said wall forming an inner nozzle for carrying said encapsulant gas, said hole intersecting said passage at a location spaced upstream from said tip;

said outer nozzle end opening to an environment which solidifies said encapsulant liquid.

* * * * *